Oct. 22, 1963  H. B. WONG  3,107,878
MULTIPLE REEL CARRIER
Filed June 16, 1961  2 Sheets-Sheet 1
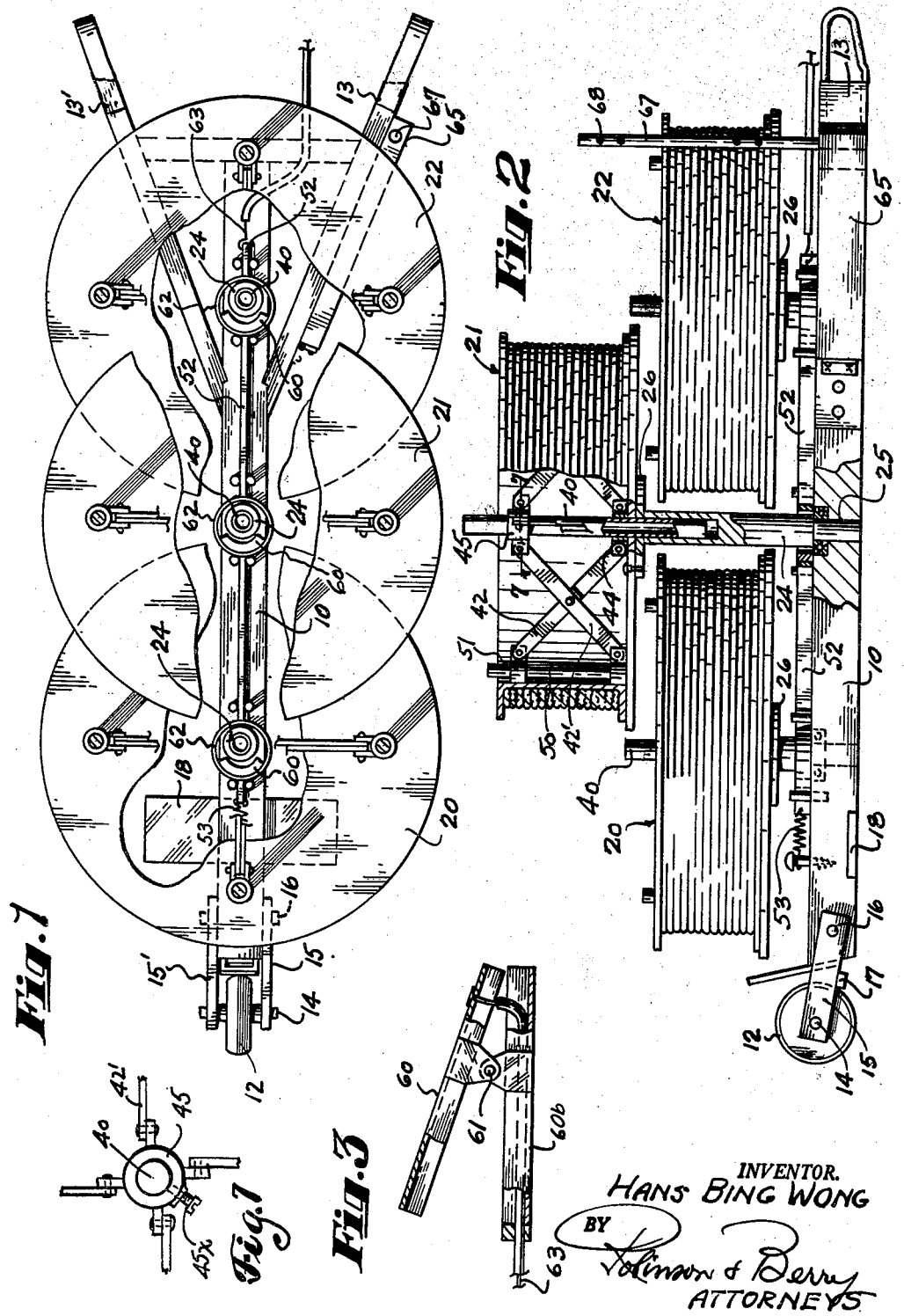
INVENTOR.
HANS BING WONG
BY
ATTORNEYS

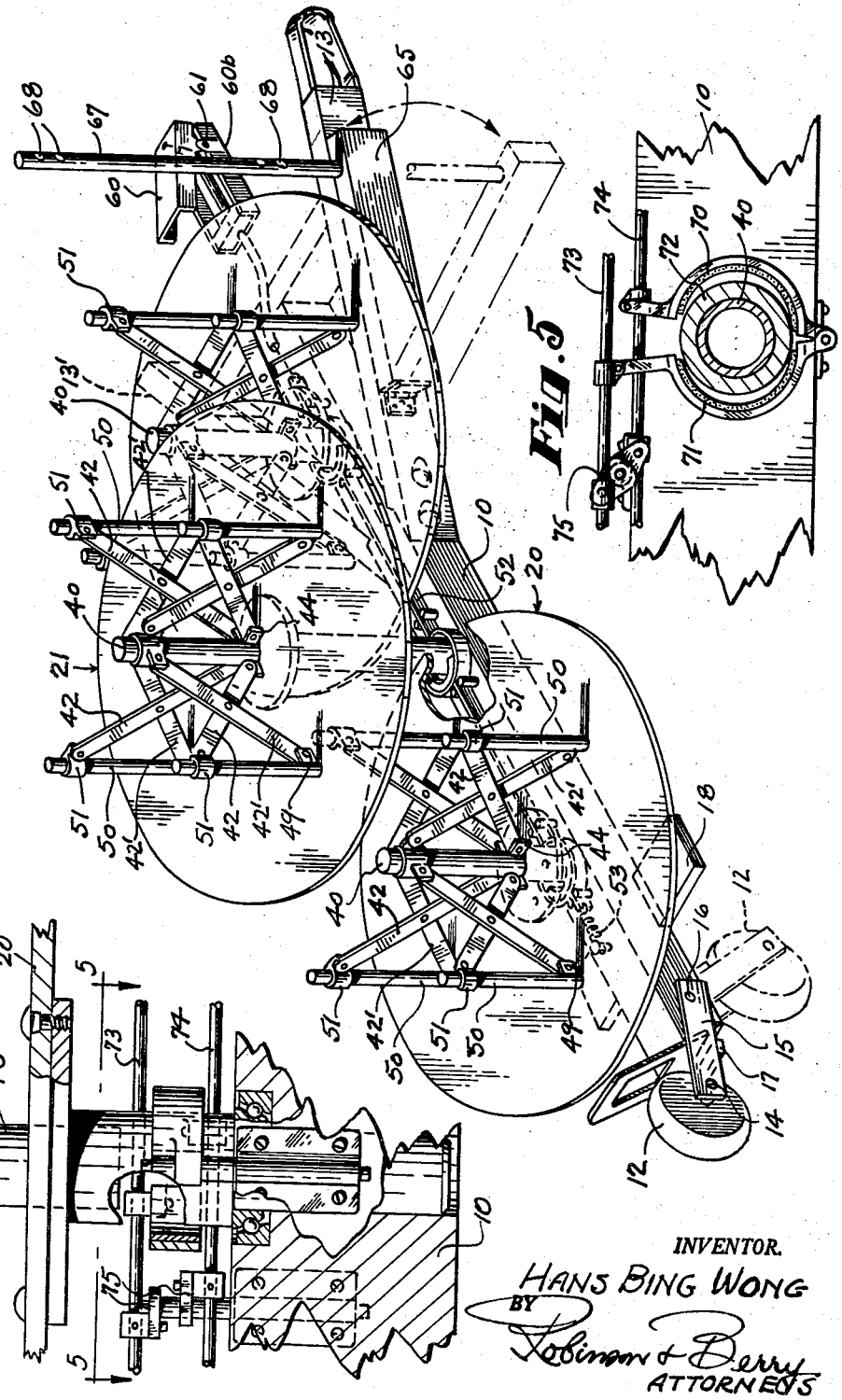

United States Patent Office 3,107,878
Patented Oct. 22, 1963

3,107,878
MULTIPLE REEL CARRIER
Hans B. Wong, 4317 W. Hanford St., Seattle, Wash.
Filed June 16, 1961, Ser. No. 117,660
2 Claims. (Cl. 242—86.7)

This invention relates to multiple reel carriers as designed for the conveyance and dispensing of wire from coils as applied to said reels.

More particularly, the invention relates to the provision of a means for mounting a plurality of wire coil supporting and dispensing reels as a unitary carrier structure of wheelbarrow-like character that may be readily rolled from one place of use to another.

It is the primary object of this invention to provide a multiple reel carrier of the above stated character wherein each coil mounting reel is diametrically adjustable to adapt it to serve wire coils of various diameters and which reels are equipped with normally disengaged brakes to permit their free rotation but which brakes may be readily manually applied when it is desired to prevent the free turning of reels and an incident unwinding of wire from the coils supported thereby.

It is also an object of this invention to provide a reel mounting and carrying frame comprising a central longitudinal beam on which the plurality of reels are rotatably mounted at spaced intervals therealong and which beam is equipped at its forward end with a supporting wheel and at its opposite end with paired handles for use in the rolling of the carrier from place to place.

Yet another object of the invention is to provide the reels with a foot pedal type of brake setting and releasing means for the simultaneous operation of all brakes.

Still further objects and advantages of the invention reside in the specific details of construction and combination of parts embodied therein and in their manner of assembly and use, as will herein be fully described.

In accomplishing these and other objects of the invention I have provided the improved details of construction, the preferred forms of which are illustrated in the accompanying drawings wherein:

FIG. 1 is a plan or top view of a multiple reel mounting carrier embodied by the present invention.

FIG. 2 is a side view of the carrier with parts shown in vertical section.

FIG. 3 is a side view, partly in section of the brake applying pedal.

FIG. 4 is a perspective view of the carrier with coils removed from its several reels.

FIG. 5 is a sectional view taken on line 5—5 in FIG. 6.

FIG. 6 is an enlarged sectional detail of parts of the braking means, as seen in FIG. 5.

FIG. 7 is a horizontal sectional detail taken on line 7—7 in FIG. 2.

Referring more in detail to the drawings:

In its present preferred form of construction the reel carrier device embodied by this invention comprises a frame having a central, longitudinally extending beam 10 of suitable strength for this purpose and of a length to accommodate the desired number of reels thereon in the manner herein illustrated. It is herein-shown that, at its forward end, the beam 10 is equipped with a supporting wheel 12 and at its rear end is equipped with a pair of laterally diverging handle bars 13 and 13' positioned for use in the wheeling of the carrier from place to place.

The wheel 12 is aligned with the beam and is mounted for free rotation on an axle forming rod 14 that is extended through the wheel hub between the outer ends of laterally spaced bars 15—15' which, at their inner ends are pivotally hinged to the opposite side faces of beam 10 by a cross-pin or bolt 16; the two bars 15—15' are rigidly joined between their ends by a metal cross-bar 17 that preferably is welded thereto.

When it is desired to roll the carrier from one place to another the wheel 12 is swung to a position below and within the end limit of beam 10, as shown in dash lines in FIG. 4 where it will be automatically retained by reason of the weight of beam 10 and parts mounted thereon. During use of the reels, as presently explained, the wheel 12 is swung about pivot bolt 16 to its full line position of FIGS. 2 and 4. Also, as shown in FIGS. 1 and 2, a horizontal plate 18 is fixed to the under edge of beam 10 to extend substantially to opposite sides thereof, to rest flatly on a floor or supporting surface to coact with the two handle bars 13—13' to prevent lateral tipping of the structure while at rest.

The present carrier structure is designed for the mounting thereon of three wire dispensing reels which are herein designated, respectively, by reference numerals 20, 21 and 22. The reels 20 and 22 are set at the same horizontal level of about four inches above the top surface of beam 10 while the intermediate reel 21 is supported at a substantially higher level of about sixteen inches.

Each reel is fixedly mounted for axial rotation on the upper end of a standard 24 which is rotatably contained at its lower end in a hole 25 that is bored to receive it vertically in the beam 10. Each standard extends the desired distance upwardly from the beam. It is observed that the standards for reels 20 and and 22 are relatively short, and each shaft has a flat, circular plate 26 fixed to its upper end that is fixed concentrically to the under face of the reel as shown in FIG. 2.

Each reel has a coaxially and upwardly extending stem or standards 40 fixed therein which mounts a plurality of radially extending wire coil centering arms. Each arm, as best shown in FIG. 4, comprises a pair of crossed and pivotally joined lazy tong levers 42—42' with pivotal connections 43 at their inner ends, respectively, with ears 44 extending outwardly from the axial standard 40 of the reel and from a collar 45 at a higher level that is vertically slidable on the standard or stem 40. At their outer ends the cross levers 42—42' are pivotally attached, respectively, to ears 49 fixed on vertical legs 50, and collars 51 that are slidable on the upper end portions of said legs. The wire coils from which wire is to be dispensed, are disposed as shown in FIG. 2 on the reel plates 20, 21, 22 about the arms 50 as associated with each reel. It is to be understood that expandable and contractable coil holders will automatically adjust in such a way as to conform to the size of a coil placed on the reel and from which wire is to be dispensed.

It is to be noted that the standard that rotatably supports the central reel 21 is mounted on beam 10 between the closely adjacent edges of the two lower reels 20, 22 but at such height above the lower reels that there is no operational interference between them.

It has been shown in FIGS. 1 and 2 that the cylindrical, rotatable mounted standard 40 of each reel has a brake shoe 60 fitted thereto at one side thereof; each shoe being fixed within a ring 62 that surrounds the corresponding standard with substantial clearance. The several rings 62 are joined together for sliding adjustment, in unison, by a succession of bars 52. A coil spring 53 is attached under tension to the forward bar and to the beam 10 in such manner as to yieldingly hold all brake shoes normally disengaged from their respective standards. Means is provided at the handle end of the carrier beam 10 for pulling all bars rearwardly in unison thus to simultaneously apply all brakes. This brake applying means comprises a foot pedal 60, best shown in FIG. 3, that is pivoted between its ends as at 61 to a base support 60b and a flexible cable 63 is attached at one end to the rear end bar 52 and at its other end to the rear end of the pedal 60 in such manner that depression of the forward end of the pedal simultaneously shifts the bars 52 and the several brake shoes to braking positions. When braking pressure is removed from the pedal 60, the spring 53 returns all brakes to "off" positions.

It is also shown in FIG. 1 that a bracket arm 65 is hinged to handle 13 to swing outwardly therefrom, as indicated in FIG. 4 and at the outer end of this bracket is a standard 67 with wire guiding holes 68 through which wires extending from the coils applied to the reels, may be threaded for their extension to points of use.

FIGS. 5 and 6 illustrate an alternative braking means for carriers of this kind, wherein paired brake shoes 70 and 71 are applied to coact with a brake drum 72 applied to the reel mounting standards 40. These shoes are adapted for actuation by a pair of brake rods 73 and 74 extended along the rail 10 and joined by linkage 75 shown in FIG. 5 for simultaneous actuation in opposite directions to apply the brakes. Any suitable manually operable means may be used to actuate the rods 73—74 for brake application.

The expandable reels are generally contracted to small diameter for the placement of the wire coils thereover and are then expanded to fit the coil either on a spool or in unspooled ends. Then the expandable reel is secured by tightening the set screws 45x as applied through their collars 45 against the central shafts 40.

What I claim as new is:

1. A multiple reel carrier comprising a central longitudinal beam with handle means at one end for its manual movement and a single wheel at its other end coacting with said handle means for its rolling support, a succession of reel mounting spindles revolubly mounted in and extending upwardly from the beam at spaced intervals therealong, a coil mounting reel fixed for support and axial rotation on each spindle, and a braking means for each reel; said braking means for each reel comprising its mounting spindle and a brake shoe engageable with the spindle, spring means common to all braking means normally retaining the brake shoes disengaged from braking contact with the corresponding spindles, and a manually operable pedal common to all shoes for actuating them to braking positions in unison.

2. A multiple reel carrier according to claim 1 wherein a ring surrounds each spindle for rotative adjustment thereabout, and wherein each ring pivotally mounts a spindle braking shoe for swinging movement between braking and non-braking positions, bars joining said rings for their simultaneous rotative adjustment for braking, a foot pedal operable for simultaneously actuating all bars for braking and a spring operable for simultaneously actuating all bars for brake releasing.

References Cited in the file of this patent

UNITED STATES PATENTS

| | | |
|---|---|---|
| 906,547 | Moss | Dec. 15, 1908 |
| 1,864,558 | Seeley | June 28, 1932 |
| 2,417,553 | Jensen | Mar. 18, 1947 |
| 2,635,827 | Stemm et al. | Apr. 21, 1953 |
| 2,637,509 | Stanius | May 5, 1953 |
| 2,762,577 | Herr | Sept. 11, 1956 |